United States Patent
Krishnan

(10) Patent No.: US 6,381,453 B1
(45) Date of Patent: *Apr. 30, 2002

(54) DUAL MODE NETWORK CALL FORWARDING ACTIVATION AND DEACTIVATION

(75) Inventor: Arjun Krishnan, Richardson, TX (US)

(73) Assignee: Nokia Mobile Phones Ltd, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/072,387

(22) Filed: May 4, 1998

Related U.S. Application Data

(63) Continuation of application No. 08/675,739, filed on Jul. 3, 1996, now Pat. No. 5,826,191.

(51) Int. Cl.⁷ .............................................. H04M 3/42
(52) U.S. Cl. ..................... 455/414; 455/445; 455/435; 455/426
(58) Field of Search ................................. 455/414, 434, 455/435, 436, 433, 552, 67.1, 417, 445, 416, 461, 467, 551, 466, 428

(56) References Cited

U.S. PATENT DOCUMENTS 5,826,191 A * 10/1998 Krishnan .................... 455/432
5,845,207 A * 12/1998 Amin .......................... 455/414
5,852,777 A * 12/1998 Harrison ...................... 455/414
5,920,812 A * 7/1999 Palviainen ................... 455/417
5,933,784 A * 8/1999 Gallagher .................... 455/552
5,966,653 A * 10/1999 Joensuu ....................... 455/414

* cited by examiner

*Primary Examiner*—Vivian Chang
*Assistant Examiner*—John J. Lee
(74) *Attorney, Agent, or Firm*—Brian T. Rivers

(57) ABSTRACT

An apparatus and method, in a telecommunications network having a first and a second system, for activating and deactivating call forwarding from a dual mode subscriber station's number in the second system to the subscriber station's number in the first system. A first message is transmitted upon initiation of communication between the subscriber station and the first system. If it is determined that a data field in the first message is in the first state, call forwarding from the subscriber number of the second system to the subscriber number of the first system is activated. If the data field is in a second state, call forwarding from the subscriber number of the second system to the subscriber number of the first system is not activated. An indication of at least one type of selected subsequent event, upon which the user of the subscriber station desires to deactivate the call forwarding may also be included in the first message. If the selected event occurs, the call forwarding will be deactivated. The occurrence of the selected event may be signaled to the first system by the subscriber station in a second message.

10 Claims, 3 Drawing Sheets

DUAL MODE NETWORK CALL FORWARDING ACTIVATION AND DEACTIVATION

This application is a continuation of U.S. application Ser. No. 08/675,739 filed on Jul. 3, 1996, now U.S. Pat. No. 5,826,191.

FIELD OF THE INVENTION

This invention relates to call forwarding between systems in a telecommunications network, and, more particularly, to an apparatus and method for activating and deactivating call forwarding from a subscriber number of a first system to a predetermined subscriber number of a second system, utilizing messages transmitted from a subscriber station operating in the second system.

BACKGROUND OF THE INVENTION

Developments in wireless systems technology have resulted in a variety of systems being available for use by system subscribers. Many different types of wireless systems now exist or have been proposed at the concept stage. These wireless systems include conventional cellular and PCS systems that allow a system user to make and receive phone calls through a mobile station while roaming in the large geographic area covered by the system. These wireless systems also include cordless or wireless residential systems that allow system users to make and receive phone calls through a mobile handset while within a smaller coverage area, such as within a residence or an office building.

Cellular and PCS systems include base stations that are dispersed in locations through the coverage area of the system, which may be an area such as the area of a few cities or a state, or a larger area. These base stations each provide a radio interface between the system and the mobile stations as the mobile stations roam through the system. The base stations are connected to and controlled by one or more mobile switching centers (MSCs) that communicate with the base stations to provide the intelligent functions necessary for call routing and other operations of the system. The cellular/PCS system is most often connected to a public switched telephone network (PSTN) to provide phone connections to general public service.

A cordless or wireless residential system typically operates with a personal base station (PB) providing a radio interface between the system and the mobile handset. The PB can provide a range of intelligent functions, depending on the system type. Depending on the size of the system, different numbers of base stations are used. For example, if the cordless or wireless residential system is located in a residence, only one PB may be necessary. The PB of a cordless or residential system may be connected to a PSTN through a single wireline connection. If the cordless or residential wireless system covers an office building, more than one PB, one on each floor for example, may be necessary. When more than one PB is used, the PBs may be connected to the PSTN through a private branch exchange (PBX) if necessary.

Networks containing Cellular or PCS systems combined with cordless or wireless residential systems (cellular/PCS wireless esidential networks) have recently been proposed in the telecommunications industry. In a cellular/PCS wireless residential network, a system subscriber is assigned a dual mode mobile station (DMM) that may be operated in either a wide area cellular/PCS system or the subscribers residential cordless system. In this type of network each of the cellular/PCS and residential cordless system s is typically connected to the public switched telephone network(PSTN).

In the cellular/PCS wireless residential network the subscriber may roam about the coverage area of the cellular/PCS system, while using the handset to initiate and receive calls over the radio channels of the cellular/PCS system. The subscriber may also move into the coverage area of the subscriber's residential cordless system and make and receive calls over the residential cordless system radio channels. Selection between which of the two systems the subscriber operates in may be done manually by the subscriber, or automatically within the network. For example, the cellular/PCS residential system could be designed so the DMM is switched from communications on the cellular/PCS radio channels air interface to communications on the cordless system radio channels when signal strength levels received at the handset on the radio channels of the residential cordless system become greater than a certain threshold level.

In a typical cellular/PCS residential system a subscriber may be assigned two phone numbers within the PSTN. One phone number would be assigned as the subscribers cellular/PCS number, and the other phone number would be assigned to the wireline connection to the residential cordless system PB as the residential number. Calls made to the cellular/PCS n umber a re directed to the cellular/PCS system and calls made to the residential number would be directed to the residential cordless system. If the subscriber is actively using the DMM within the cellular/PCS system, i.e., is registered in the cellular/PCS system, and a call is made to the cellular/PCS number, the call is directed to the DMM within the cellular/PCS system. Calls directed to the residential cordless number are received at the PB or PBs of the cordless system. If the subscriber's DMM is active in the cordless system and a call is made to the PB number, the subscriber's DMM will be alerted.

Since a cellular/PCS residential subscriber moves between and operates in both systems, the subscriber may desire that he be able to receive calls made to the phone number assigned for one system at the phone number assigned for the second system, when the subscriber is operating in the second system. For example, the subscriber may desire to receive calls made to his Cellular/PCS number, as well as to the residential number, when operating in the residential cordless system. This may be the case if the cellular/PCS number is used as a business number by the subscriber and the subscriber wishes that calls to the business number reach the subscriber when the subscriber is in his residence and the subscriber's DMM is operating in the residential cordless mode.

In one possible solution, the dual mode subscriber could implement desired call forwarding from the cellular/PCS number to the residential number before leaving the cellular PCS system from the DMM using presently existing call forwarding technology and techniques. However, once activated, the call forwarding would remain active until deactivated from the DMM in the cellular/PCS system and could not be controlled from the residential cordless system.

In another possible solution, call forwarding from the cellular/PCS number to the residential number may be automatically activated by a signal sent through the PSTN upon each registration of the DMM with a PB in the residential cordless system. The call forwarding could then be cancelled upon registration of the DMM in the cellular/PCS system. This solution suffers from the shortcoming that the dual mode subscriber could not deactivate the call forwarding from the cellular/PCS number to the residential number that would occur while operating in the residential system, until the DMM was registered again in the cellular/PCS system. There also may be situations in which the dual mode subscriber does not wish to receive forwarded calls.

The above solutions also suffer from another shortcoming in that they do not allow the dual mode subscriber the option of deactivating activated call forwarding from the cellular/PCS number to the residential number upon certain select conditions. For example, the dual mode subscriber may desire that activated call forwarding be deactivated when the DMM switches from the cordless residential mode to the cellular/PCS mode of operation but not when the DMM is powered down or loses communication with the residential cordless system.

SUMMARY OF THE INVENTION

The present invention provides an apparatus and method, in a network having a first and a second system, for activating and deactivating call forwarding from a predetermined subscriber number of the second telecommunications system to the subscriber number of a first telecommunications system, utilizing messages transmitted from a subscriber station operating in the first telecommunications system. In the method and apparatus taught by the invention, a first message including a first data field having at least two states is transmitted to the first system from the subscriber station. The first message is transmitted upon initiation of communication between the subscriber station and the first system. A determination is then made within the first system as to whether or not the data field is in a first state. If it is determined that the data field is in the first state, call forwarding from the subscriber number of the second telecommunications system to the subscriber number of the first system is activated. If the data field is in a second state, call forwarding from the subscriber number of the second telecommunications system to the subscriber number of the first system is not activated. An indication of at least one type of subsequent event upon which the user of the subscriber station desires to deactivate call forwarding may also be included in the first message. The information on the at least one type of subsequent event included in the first message may be stored in the first system as call forwarding deactivation conditions. The first message may also be transmitted during operation of the subscriber station in the first system to change the present call forwarding status and deactivation conditions.

A second message may also be transmitted to the first system from the subscriber station when communications between the subscriber station and the first system cease. The second message contains an indication that an event has occurred in the system. If no second message is received by the first system within a predetermined time period after communications between the subscriber station and the first system cease, the first system may determine that a loss of communications event has occurred. A determination is then made as to whether or not the operator of the subscriber station desires to deactivate call forwarding from the subscriber number of the second telecommunications system to the subscriber number of the first system upon the occurrence of the event that the second message indicates occurred, or upon a loss of communications event. If the operator of the subscriber station desires to deactivate call forwarding upon occurrence of the event and call forwarding has been activated, the call forwarding is deactivated.

The method and apparatus of the invention allows a system subscriber who operates subscriber stations in both the first and second systems to easily determine and control activation and deactivation of call forwarding to have calls routed from the subscriber's number in the second system to the subscriber's number in the first system when operating a subscriber terminal in the first system. The method and apparatus removes the need for the subscriber to activate and deactivate call forwarding while operating within the second system before beginning, or after terminating, operation of the subscriber terminal in the first system to achieve the same result. The method and apparatus of the invention is an improvement over methods used in dual mode networks in which call forwarding from a second number to a first number is always automatically activated without user choice upon registration of a dual mode subscriber station in the first network.

In an embodiment of the invention, the method and apparatus is implemented within a telecommunications network having a first and a second system, and a dual mode mobile station (DMM) capable of operating in either the first or second system. A first subscriber number is assigned to the DMM in the first system and a second subscriber number is assigned to the DMM in the second system. The second subscriber number may be the wireline number to which a personal base station (PB) of the first system is connected. The user of the DMM may operate the DMM in either the first or second mode by switching manually between the modes, or the DMM may switch between the first and second modes automatically dependent upon the system in which the DMM is located.

When the DMM begins operation in the first mode in the first system, a registration message is transmitted to the first system from the DMM. The registration message includes a field including a registration bit that is set to one or zero. The registration bit may be selectively set by a user of the DMM from a menu selection. The first system receives the registration message and determines the state of the registration bit. If the registration bit is set to a predefined state, the first system then initiates transmission of a signal to the second system through the network. In response to receiving the signal, the second system then activates call forwarding from the second subscriber number to the first subscriber number. After activation of call forwarding, calls to the second subscriber number will be routed to the first subscriber number. Deactivation event data stored in the first system may also be transmitted in the registration message when the DMM begins operation in the first mode. The deactivation event data may include a user termination bit, a power down bit, and a loss of communication bit. The state of each of these bits indicates whether the first system should signal the second system upon the occurrence of the event, so that activated call forwarding from the second subscriber number to the first subscriber number is deactivated.

When operation of the DMM in the first mode ends, a deregistration message may be transmitted to the first system from the DMM. The deregistration message includes a field including a power down bit and a user termination bit. The power down bit indicates that the deregistration message is transmitted as the result of a power down of the DMM while in the first mode. The user termination bit indicates that the deregistration message is the result of the user terminating the first mode operation for the DMM by, for example, manually switching to the second mode of operation. Upon receiving the deregistration message, the first system determines what event resuted in the deregistration. Alternatively, if no deregistration message is received when operation of the DMM ceases in the first system, the first system may determine that a loss of communications event has occurred.

Based on the deactivation event data stored in the first system, the first system then determines whether or not to transmit a signal to the second system to initiate deactivation of call forwarding from the second subscriber number to the first subscriber number.

BRIEF DESCRIPTION OF THE DRAWINGS

A more complete understanding of the method and apparatus of the present invention may be had by reference to the following detailed description when read in conjunction with the accompanying drawings wherein.

DETAILED DESCRIPTION OF THE INVENTION

Figure 1:
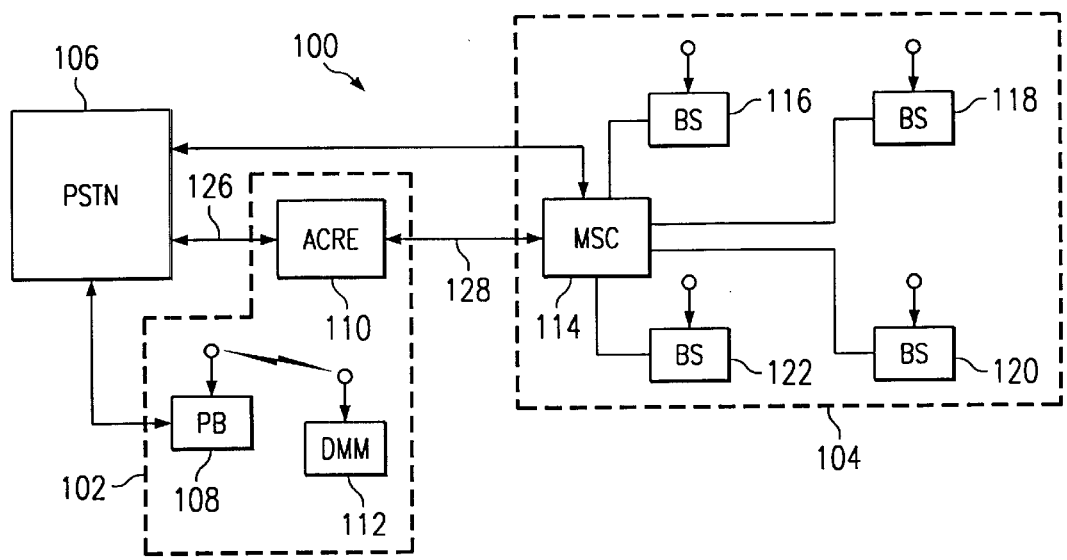
FIG. 1 illustrates a telecommunications network constructed and operated according to an embodiment of the invention.

FIG. 1 illustrates a telecommunications network constructed and operated according to an embodiment of the invention. Network 100 comprises wireless residential system (WRE) 102, cellular system 104, and dual mode mobile station (DMM) 112. In the embodiment of FIG. 1, DMM 112 can be operated in either cellular mode to communicate with cellular system 104, or in WRE mode to communicate with WRE 102. DMM 112 is assigned a phone number (cellular number) within network 100 for operation in cellular system 104. When DMM 112 is operating in WRE mode, DMM 112 operates using the phone number (PB number) assigned to WRE 102. The selection between cellular mode and WRE mode may be performed automatically within DMM 112. For example, WRE 102 may be designated as the preferred system, and as long as the signal strength of communications between DMM 112 and WRE 102 stays above a predefined level, network 100 and DMM 112 will continue communicating through WRE 102. When the signal strength of communications between WRE 102 and DMM 112 falls below the predefined level, DMM 112 switches to cellular mode and communicates with cellular system 104. As an alternative, a user of DMM 112 may manually select to operate in the cellular mode or WRE mode. In this alternative, the user may select the cellular mode to receive phone service while away from his residential area and in the service area of cellular system 104. If the user is within the coverage area of PB 108, he may select WRE mode to receive phone service through WRE 102.

Cellular system 104 comprises mobile switching center (MSC) 114 and, by example, four base stations (BSs) 114, 116, 118 and 120. In the embodiment of FIG. 1, MSC 114 comprises the home system MSC of DMM 112 for the cellular mode of operation. Cellular system 104 may include more or fewer base stations and more MSCs than are shown. In the embodiment of FIG. 1, cellular system 104 may be a cellular system that operates according to one of the known standards for cellular system operation. For example, cellular system 104 may operate in the 824.01–893.97 MHz frequency band according to the IS-91 standards specification published by the Telecommunications Industry Association/Electronic Industry Association (TIA/EIA IS-91). Alternately, cellular system 104 may operate according to another standard, such as GSM, AMPS, TACS, IS-136, or PCS 1900.

WRE 102 may be a cordless system capable of operating within the same frequency range as cellular system 104. WRE 102 comprises personal base (PB) 108 and authorization and call routing equipment (ACRE) 110. PB 108 is connected to the public switched telephone network (PSTN) through RJ-11 wireline connection 124. Although shown to include only PB 108, WRE 102 may also include additional PBs. PB 108 and ACRE 110 are connected together through the (PSTN) 106. ACRE 110 provides the operator of network 100 with direct control of PB 108 via a wireline connection 124 through PSTN 126. ACRE 110 may be used to control the operation of PB 108 as regards channels authorized for use, authorization duration, maximum power level for operation, etc. An authentication procedure performed between PB 108 and ACRE 110 may be used to prevent unauthorized operation of mobile stations in WRE 102. Methods of implementing authentication procedures, assigning channels, and setting power levels in systems such as WRE 102 are known and will not be described in detail.

Figure 2A:
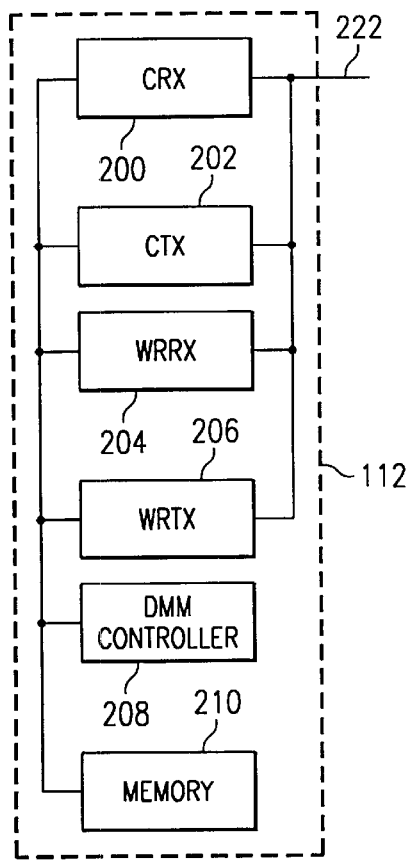
FIGS. 2A–2C are block diagrams showing portions of a dual mode mobile station, a personal base station, and authorization and call routing equipment, respectively, of the telecommunications network illustrated in FIG. 1.
Figure 2B:
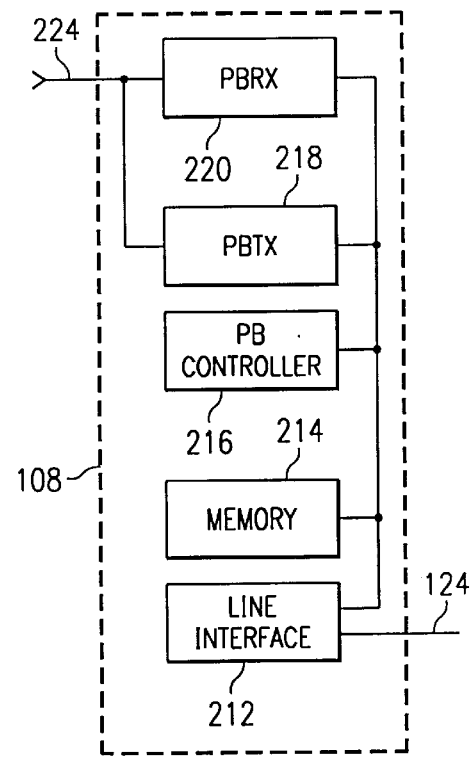
Figure 2C:
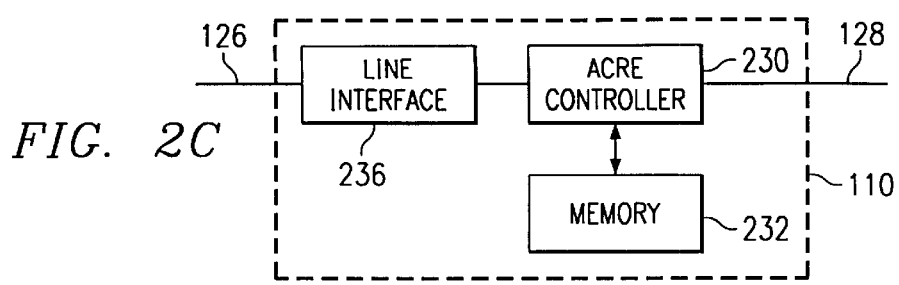

Referring now to FIGS. 2A, 2B, and 2C, therein are block diagrams showing portions of DMM 112, PB 108, and ACRE 110, respectively, of network 100 of FIG. 1. DMM 112 comprises antenna 222, Cellular mode receiver (CRX) 200, cellular mode transmitter (CTX) 202, wireless residential receiver (WRRX) 204, wireless residential transmitter (WRTX) 206, DMM controller 208, and memory 210. CRX 200 and CTX 202 are used to communicate with base stations 116,118, 120 and 122 of cellular system 104 when DMM 112 is in cellular mode. WRRX 204 and WRTX 206 are used to communicate with PB 108 when DMM 112 is in WRE mode. DMM controller 208 controls the interpretation and response to transmissions received from the network 100 and the generation and formatting of transmissions to the network 100 by interfacing with memory 210, the user audio interface, the user keyboard and user display (not shown). PB 108 comprises personal base receiver (PBRX) 220, personal base transmitter (PBTX) 218, PB controller 216, memory 214, antenna 224, and line interface 212. PBRX 220 and PBTX 218 communicate through antenna 224 with mobile stations, such as DMM 122 that are within the coverage area of PB 108 and operating in the WRE mode. PB 108 sends and receives communications to and from ACRE 110 through PSTN 106 over RJ-11 interface 124 via line interface 212. PB controller 216 controls the generation and formatting of messages sent to ACRE 110 and DMM 112, and the interpretation and response to messages received from both ACRE 110 and DMM 112 by interfacing with memory 214, DMM 112 and ACRE 110. ACRE 110 comprises line interface 236, controller 230, and memory 232. ACRE 110 sends and receives communications to and from PB 108 through PSTN 106 over RJ-11 interface 126 via line interface 236. ACRE 110 also sends and receives communications to and from MSC 114 over interface 128. ACRE controller 230 controls the generation and formatting of messages sent to MSC 114 and PB 108, and the interpretation and response to messages received from MSC 114 and PB 108 by interfacing with memory 232, PB 108, and MSC 114.

In the embodiment of FIG. 1 and in accordance with an aspect of this invention, a user of DMM 112 may selectively choose whether or not calls made to the cellular number of DMM 112 are forwarded and routed to the number of WRE 102 (PB number) when DMM 112 is registered in WRE 102. The user may choose to activate or deactivate the cellular to PB call forwarding through a menu selection process at DMM 112. The menu selection process allows the user to choose whether the call forwarding is automatically activated upon registration and also to specify what events will result in deactivation of activated call forwarding upon DMM 112 leaving WRE 102. The user is allowed to set the state of call forwarding fields (CF fields), which may be one bit each, that are included in each registration message transmitted to PB 108 of WRE 102 by DMM 112. Once the state of the CF fields is set, the data is stored in memory 210 of DMM 112 until a user enters changes. Whenever a registration message is transmitted to PB 108, the current state of the CF fields in memory 210 is used to set the CF fields in the registration message. If DMM 112 is currently registered in WRE 102 when a user enters changes to the CF fields, a new registration message that contains the new CF field states is transmitted.

Figure 3:
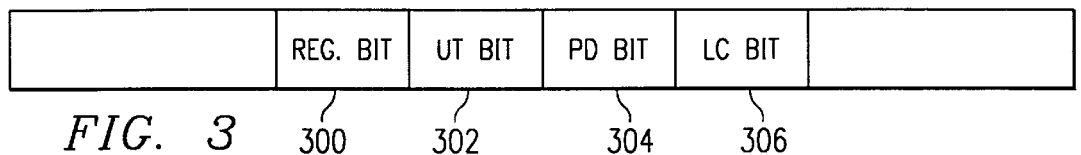
FIG. 3 illustrates registration message call forwarding fields according to an embodiment of the invention.

Referring now to FIG. 3, therein are illustrated registration message call forwarding fields according to the embodiment of FIG. 1. The CF fields include the CALL-FORWARDING-REGISTRATION field (REG bit) 300, CALL-FORWARDING-USER-TERMINATION field (UT bit) 302, CALL-FORWARDING-POWER-DOWN field (PD bit) 304, and CALL-FORWARDING-LOSS-OF-COMM field (LC bit) 306.

The state of REG bit 300 determines whether cellular to PB call forwarding is to be activated in network 100 upon registration of DMM 112 in WRE 102. The state of UT bit 302 determines whether activated cellular to PB call forwarding is deactivated upon a user termination event that results in DMM 112 leaving WRE 102. A user termination event may occur when the user manually switches to cellular mode from WRE mode. A user termination event may also be defined to occur when the user moves out of the coverage area of WRE 102, and DMM 112 automatically switches to cellular mode. The state of PD bit 304 determines whether activated cellular to PB call forwarding is to be deactivated upon a power down event that results in DMM 112 leaving WRE 102. A power down event may occur when the power switch of DMM 112 is switched off. The state of LC bit 306 determines whether activated cellular to PB call forwarding is deactivated upon a loss of communication between DMM 112 and WRE 102. A loss of communication event may occur when communications between DMM 112 and WRE 102 are suddenly cut off, for example, if DMM 112 malfunctions.

Figure 4:
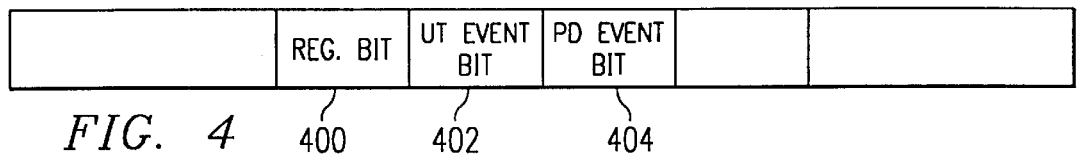
FIG. 4 illustrates deregistration message call forwarding fields according to an embodiment of the invention.

When DMM 112 is currently registered in WRE 102 and a user termination or power down event occurs, a deregistration message is transmitted from DMM 112 to PB 108. The deregistration message includes a field indicating which event resulted in the DMM 112 leaving WRE 108. Referring now to FIG. 4, therein are illustrated deregistration message call forwarding fields according to the embodiment of FIG. 1. The CF fields in the deregistration message include the CALL-FORWARDING-REGISTRATION field (REG bit) 400, CALL-FORWARDING-USER-TERMINATION field (UT event bit) 402, CALL-FORWARDING-POWER-DOWN field (PD event bit) 404. The REG bit 400 is set to the value as in the registration message. The state of UT event bit 402 indicates to WRE 102 whether or not the deregistration message is the result of a user termination of operation of DMM 112 in WRE 102. The state of PD event bit 404 indicates to the WRE 102 whether or not the deregistration was the result of a power down of DMM 112 while operating in WRE 108.

Figure 5:
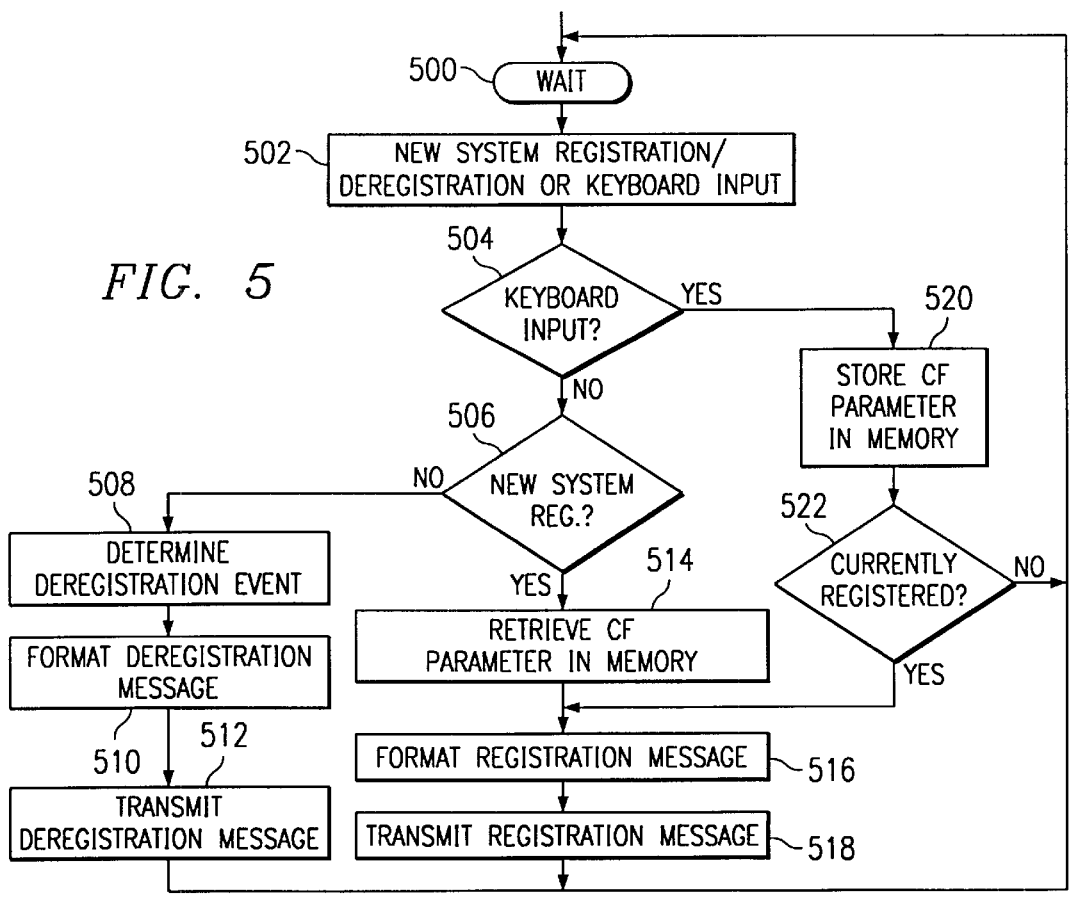
FIG. 5 is a flow diagram showing call forwarding activation and deactivation process steps performed within a mobile station according to an embodiment of the invention.

Referring now to FIG. 5, therein is a flow diagram showing call forwarding activation and deactivation process steps performed within DMM 112 according to the embodiment of FIG. 1. The process is initially in the wait state of step 500 while waiting for an input. DMM 112 may be currently registered or not currently registered in WRE 102 while the process is in the wait state of step 500.

At step 502 a process input, which may be an indication that initial registration is necessary in WRE 102, an indication that deregistration from WRE 102 is necessary, or an indication of keyboard entry in the menu to change the current CF conditions is received by DMM controller 208. The keyboard menu entry could be received either while DMM 112 is currently registered or not currently registered in WRE 102.

After receiving an input at step 502, DMM controller 208 determines if the input was an indication of keyboard entry to change CF conditions. If it is determined that the input was not an indication of keyboard entry to change the CF conditions, the process moves to step 506. At step 506 DMM controller 208 determines whether the input was an indication that an initial registration is necessary. If it is determined that an initial registration is necessary, the process moves to step 514. At step 514 DM controller 208 retrieves the CF fields currently stored in memory 210. Next, at step 516 DMM controller 208 formats a registration message including CF fields 400–406 with states determined by the CF fields currently stored in memory 210. Next, at step 518 the DMM initiates transmission of the registration message to PB 108 of WRE 102. The process then returns to the wait state of step 500. If, however, at step 506 it is determined that initial registration is not necessary, the input received at step 502 may be an indication that a deregistration is necessary and the process moves to step 508. At step 508 DMM controller 208 determines whether a power down or a user termination event causes the deregistration. Next, at step 510 DMM controller 208 formats a deregistration message including a UT event bit 502 and a PD event bit 504 with states determined by the results of step 508, i.e., the states of UT event bit 502 and PD event bit 504 indicate which event resulted in deregistration. The process then moves to the wait state of step 500.

If, however, at step 504 it was determined that the input was an indication of keyboard menu entry to change the CF conditions, the process moves to step 520. At step 520 DMM controller 208 stores the states of the CF fields from the latest keyboard menu entries in the CF fields of memory 210. CF field values not changed by keyboard menu entry remain as already set. Next, at step 522, DMM controller 208 determines whether DMM 112 is currently registered in WRE 102. If DMM 112 is not currently registered in WRE 102, the process returns to the wait state of step 500. If, however, DMM controller 208 determines that DMM 112 is currently registered in WRE 102, the process moves to step 516. At step 516 DMM controller 208 formats a registration message including the CF fields 400–406 with states determined by the new CF fields stored in memory 210. Next, at step 518 DMM controller 208 initiates transmission of the registration message to PB 108 of WRE 102. The process then returns to the wait state of step 500.

Figure 6:
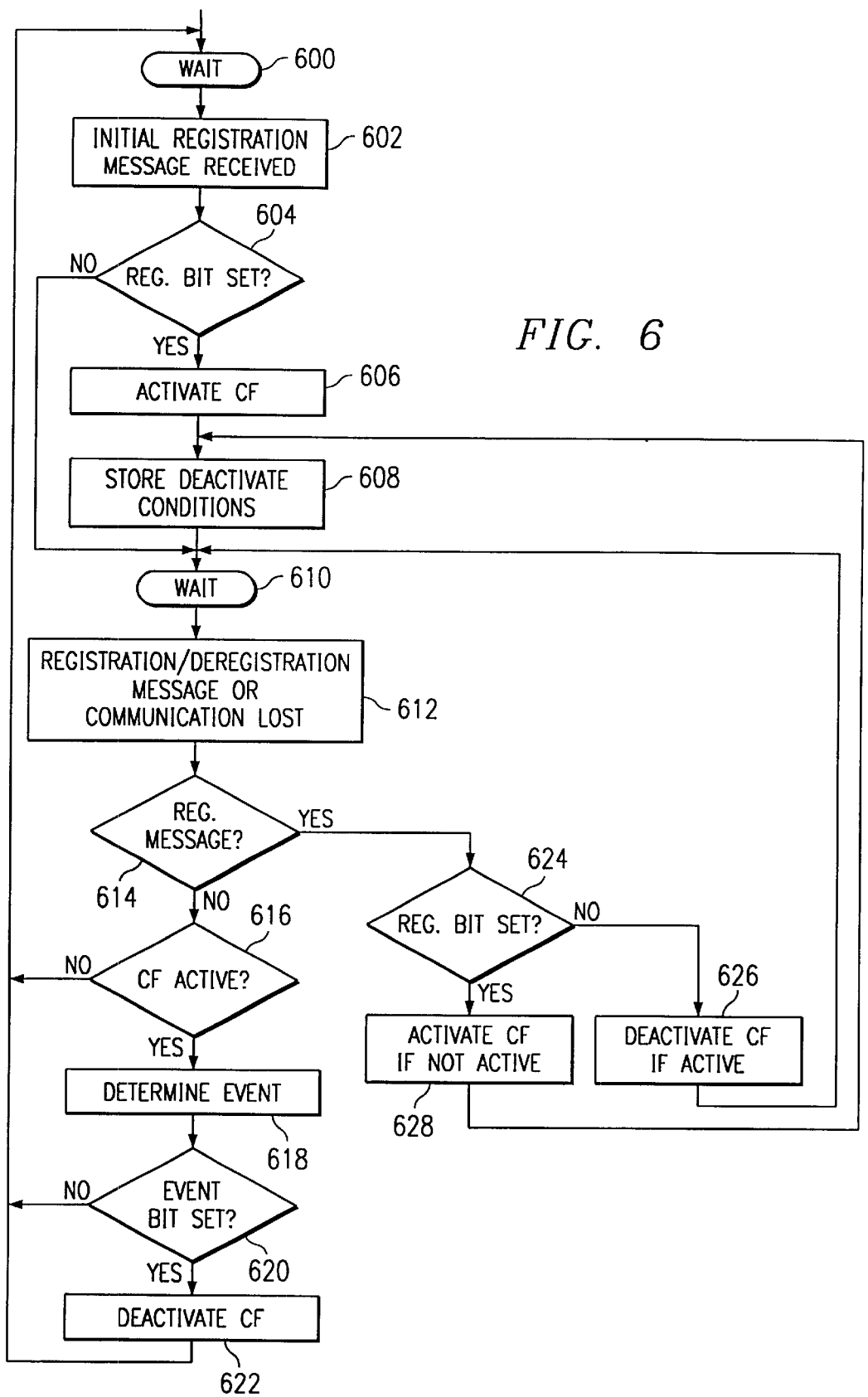
FIG. 6 is a flow diagram showing call forwarding activation and deactivation process steps performed within a telecommunications network according to an embodiment of the invention.

Referring now to FIG. 6, therein is a flow diagram showing call forwarding activation and deactivation process steps performed within network 100 according to the embodiment of FIG. 1. Initially the network process is in the wait state of step 600. When DMM 112 first moves into WRE 102 and transmits a registration message, the registration message is received by PB 108, and a message including CF fields 400–406 is transmitted through PSTN 106 to ACRE 110 at step 602. PB 108 also transmits information necessary for the ACRE to identify the cellular and PB numbers. Next, at step 604, ACRE controller 230 determines whether the state of REG bit 400 indicates that call forwarding is to be activated. If REG bit 400 indicates that call forwarding is to be activated, the process move to step 606. At step 606, ACRE controller 230 initiates the activation of cellular to PB call forwarding by transmitting a message to MSC 114 over interface 128. Next, at step 608, the states of the CF fields 400–406 in the latest received registration message are also stored in memory 232 of ACRE 110. The process then moves to the wait state of 610. If, however, at step 604 it is determined that the state of REG bit 400 indicates that cellular to PB call forwarding is not to be activated, the process moves from step 604 to the wait state of step 610.

Once DMM 112 is registered in WRE 102, the process will remain in the wait state of step 610 until a process input is received at step 612. The process input received at step 612 may be a new registration message received at PB 108, a deregistration message received at PB 108, or an indication that a determination of loss of communications has been made by PB 108. The input is received at step 612. In the case of a new registration message, the CF fields are sent to ACRE 110. In the case of a deregistration message the CF event fields are sent to ACRE 110. In the case of a loss of communications, a determination of loss of communications may be made in PB 108 if expected communications from DMM 112 are not received within a predetermined time period, and an indication of a loss of communications with DMM 112 is sent to ACRE 110.

Next, at step 614 it is determined if a new registration message has been received. If a new registration message has been received, the process moves to step 624. At step 624, ACRE controller 230 determines whether the state of REG bit 400 in the new registration message indicates that cellular to PB call forwarding is to be activated. If REG bit 400 indicates that cellular to PB call forwarding is to be activated, the process moves to step 628. At step 628, if cellular to PB call forwarding is not already activated, ACRE controller 230 activates cellular to PB call forwarding for DMM 112. The process then moves to step 608 where ACRE controller 230 stores the states of CF fields 400–406 as set in the new registration message received in step 612. The process then moves to the wait state of step 610. If, however, at step 624, ACRE controller 230 determines that REG bit 400 in the new registration message indicates that cellular to PB cellular forwarding is to be deactivated, the process moves to step 626. At step 626, if cellular to PB call forwarding is currently activated, ACRE controller deactivates cellular to PB call forwarding for DMM 112. The process then moves to the wait state of step 610.

If, however, at step 614 it is determined that the input received at step 612 was not a new registration message, the process moves to step 616. In this case a deregistration message has been received because of a user termination or power down, or a loss of communications has occurred. Next, at step 616, ACRE controller 230 determines if cellular to PB call forwarding for DM 112 is currently activated. If call forwarding is not activated, there is no need to deactivate call forwarding, and the process returns to the wait state of step 600 as DMM 112 is no longer registered in WRE 108. If, however, at step 616 it is determined that cellular to PB call forwarding for DMM 112 is currently activated, the process moves to step 618. At step 618, ACRE controller 230 determines which event, i.e., a user termination event, a power down event, or a loss of communications event, caused the input at step 612. Next, at step 620, ACRE controller 230 determines if the state of the CF field stored in memory 232 for the particular event determined to have caused the input at step 612 indicates that cellular to PB call forwarding for DMM 112 is to be deactivated upon occurrence of that particular event. If the state of the CF field for the particular event indicates that call forwarding is to be deactivated upon the occurrence of the event, the process moves to step 622. At step 622, ACRE controller 230 sends a message to MSC 114 over interface 128 to deactivate cellular to PB call forwarding for DMM 112. If, however, at step 620, it is determined that the state of the CF field indicates that cellular to PB call forwarding is not to be deactivated, the process returns to the wait state of step 600 as DMM 112 is no longer registered in WRE 108.

In an alternative embodiment, the method and apparatus may be implemented in network 100 to activate and deactivate call forwarding between the cellular number assigned to a cellular mobile station and the PB number of a physically separate WRE mobile station from the WRE mobile station. This embodiment could be used by a network subscriber who has obtained service in both the cellular and WRE system but carries separate mobile stations for each system.

Although the method and apparatus of the present invention has been illustrated and described with regard to presently preferred embodiments thereof, it will be understood that numerous modifications and substitutions may be made to the embodiments described and that numerous other embodiments of the invention may be implemented without departing from the spirit and scope of the invention as defined in the following claims.

What is claimed is:

1. In a telecommunications network having a first and a second system, and a subscriber station capable of receiving calls at a first number when operating in said first system and at a second number when operating in said second system, a method for controlling call forwarding, said method comprising the steps of:

receiving a first message in the first system, said first message transmitted from the subscriber station and including a field, said field settable to at least a first or a second state;

determining, responsive to receiving said first message, whether said field is set to said first state or said second state; and if it is determined that said field is set to said first state, registering said subscriber station in said first system and sending a second message to said second system; and if it is determined that said first field is set to said second state, registering said subscriber station in said first system without sending said second message to said second system.

2. The method of claim 1, wherein said field comprises a first field, and said first and second states comprise first and second activation states and said step of registering said subscriber in said first system and sending a second message comprises activating, in the network, call forwarding from the second number to the first number in response to receiving said second message in-said second system, and wherein said method further comprises, after said step of activating, the steps of:

receiving a third message in the first system, said third message transmitted from the subscriber station and including a second field, said second field settable to at least a first or a second event state, the state of said second field indicating whether or not a selected event has occurred in said system;

determining, responsive to receiving said third message, whether said second field is set to said first event state; and if it is so determined, deactivating in the network said call forwarding; else if it is determined that said second field is set to said second event state, allowing said call forwarding to remain activated.

3. The method of claim 2, wherein said message received in said step of receiving a message includes a third field, said third field settable to at least a first or a second deactivation state, wherein said third field is set to said first deactivation state to indicate that call forwarding should be deactivated upon the occurrence of said selected event and wherein said step of deactivating said call forwarding comprises the steps of:

determining whether said third field is set to said first deactivation state; and in response to an affirmative determination, deactivating said call forwarding.

4. The method of claim 1, wherein said field comprises a first field and wherein said first message received in said step of receiving a first message includes a second field settable to at least a first or a second deactivation state and said step of registering said subscriber station in said first system and sending a second message comprises activating call forwarding from the second number to the first number in response to receiving said second message in said second system, and wherein said method further comprises, after said step of activating the steps of:

detecting in the network a loss of communications between the first system and the subscriber station;

determining, in response to detecting said loss of communications, whether said second field is set to said first state; and in response to an affirmative determination, deactivating said call forwarding.

5. The method of claim 1, wherein said method further comprises, after said step of sending a second message to said second system, the step at activating, in response to receiving said second message in said second system, call forwarding from the second number to the first number.

6. The method of claim 1, wherein said first message comprises a registration message.

7. In a telecommunications network having a first and a second system, and a subscriber station capable of dual mode operation for receiving calls at a first number when operating in said first system, and at a second number when operating in said second system, an apparatus for controlling call forwarding from said second number to said first number, said apparatus comprising:

a receiver capable of operating in the first system, said receiver for receiving a message, said message transmitted from the subscriber station and including a field settable to at least a first state or a second state, and, further, said receiver for generating a first signal, said first signal including said field;

a first controller coupled to said receiver, said controller comprising a first memory device for storing a database associating the subscriber station with the second subscriber number, and, further, said first controller for receiving said first signal, determining whether said field is set to said first state, and registering said subscriber station in said first system, and initiating transmission of a second signal to said second system if said field is set to said first state or registering said subscriber station in said first system without initiating transmission of said second signal if said field is not set to said second state; and a second controller coupled to said first controller, said controller comprising a second memory device for storing a database associating the subscriber station with the second subscriber number, and, further, said second controller for receiving said second signal and activating call forwarding from said second number to said first number in response to receiving said second signal.

8. The apparatus of claim 7, wherein said field comprises a first field and said first and second states comprise first and second activation states, said memory device comprises a first memory device, said first controller comprises a second memory device, and said message further includes a second field settable to at least a first and a second deactivation state, wherein the state of said second field indicates whether or not said call forwarding from the second number to the first number should be deactivated, if activated, upon the occurrence of a selected event, and wherein said receiver transmits a third signal including said second field to said first controller, and said first controller stores said second field in said second memory device upon receipt of said third signal at said first controller.

9. The apparatus of claim 8, wherein said message comprises a first message and said receiver further receives a second message, said second message transmitted from the subscriber station and including a third field, said third field settable to at least a first and a second event state, the state of said third field indicating whether or not said selected event has occurred in the first system, and wherein said receiver generates a fourth signal, said fourth signal including said third field, and transmits said fourth signal to said first controller, and wherein said first controller further receives said fourth signal, and if said call forwarding is activated, compares the state of said third field with the state of said second field stored in said second memory device and initiates transmission of a fifth signal to said second controller if said third field indicates said selected event has occurred, and said second field indicates that said call forwarding from the second number to the first number should be deactivated upon the occurrence of said selected event, and wherein said second controller deactivates said call forwarding from said second number to said first number in response to receiving said fifth signal.

10. The apparatus of claim 7, wherein said message comprises a registration message.

* * * * *